July 10, 1934.  A. NYMAN  1,966,077
SURGE ABSORBING APPARATUS
Filed Feb. 17, 1931   2 Sheets-Sheet 1

INVENTOR.
Alexander Nyman
BY
ATTORNEY

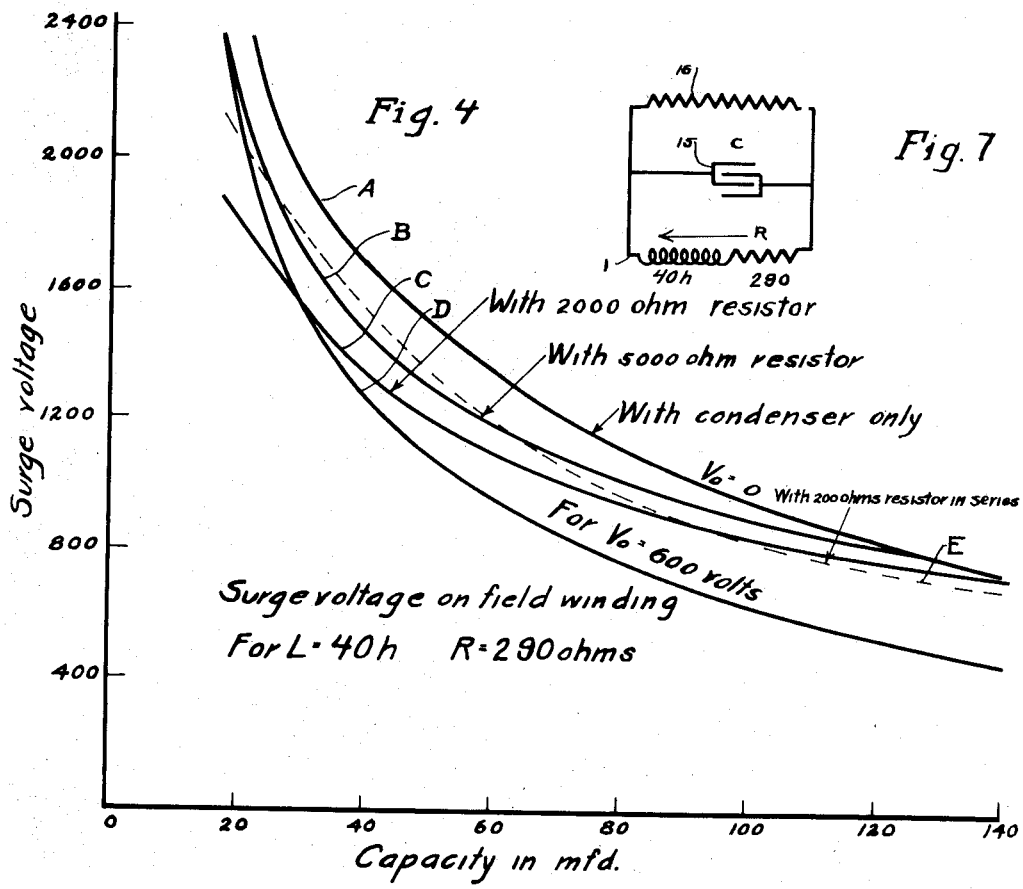
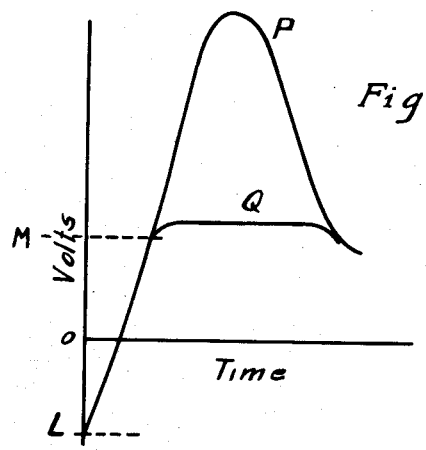
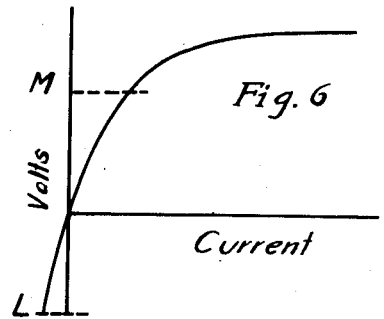

Patented July 10, 1934

1,966,077

UNITED STATES PATENT OFFICE 1,966,077

SURGE ABSORBING APPARATUS

Alexander Nyman, Dobbs Ferry, N. Y., assignor to Radio Patents Corporation, New York, N. Y., a corporation of New York Application February 17, 1931, Serial No. 516,363

7 Claims. (Cl. 175—294)

My invention relates to apparatus for and methods of operating electrical circuits containing inductive devices.

In electrical systems having an inductance of high value, considerable trouble is experienced when disconnecting the line from a power source, due to what is known as inductive kick-back or voltage surge. This voltage surge is the voltage built up in the inductance induced by the decrease in the current flow therein to zero when the line to the power supply is opened.

When there are other electrical apparatus connected in circuit with such inductances, they are subjected to the induced surge voltage, and if the electrical apparatus is of a delicate construction, may be injured thereby. A specific illustration of such a condition exists in the case of direct current machines, particularly those of the shunt type having a field winding of a relatively large number of poles and which, therefore, possess a high inductance.

When the power supplied to such a field circuit is broken, the energy stored in the magnetic field must be dissipated and, unless special provisions are made, this energy is converted into a voltage surge of high magnitude, as explained above, which may cause the break-down of insulation and serious damage to the machine or to other apparatus in the circuit of the field.

Heretofore, in the case of very large direct current machines, condensers or resistors have been used, connected in parallel with the field circuit, designed to dissipate the surge voltage energy.

However, when condensers are connected across the machines, it has been found that the capacity necessary and the voltage rating therefore are such as to make its cost prohibitive. This is evident from the following theoretical discussion, made in connection with the curves shown in Figure 4, and the circuit diagram shown in Figure 7. In the circuit diagram of Figure 7, there is shown an inductance element L, which represents the inductance of a field winding and a resistance R, which represents the resistance of this field winding.

Assuming a value C for the condenser 15 connected across the field winding and analyzing mathematically the conditions that take place when the current through the field winding is interrupted, it will be found that the maximum of the surge voltage is expressed by the formula:—

$$V_{max} = V_o \frac{Z}{2} \Sigma^{-\frac{\tan^{-1}\sqrt{Z^2-1}}{\sqrt{Z^2-1}}}$$

in which the figure $$Z = \frac{2\sqrt{L/C}}{R};$$

$\Sigma$ is the base of Naperian logarithm and $V_o$ represents the normal voltage applied to the field winding. For the practical value of Z which may vary between 3 and 10, it has been found that an approximate formula may be used, as follows:—

$$V_{max} = V_o \left( \frac{\sqrt{L/C}}{R} - .5 \right)$$

In the curve A in Figure 4, the capacity voltage characteristics obtained for a practical field winding, having an inductance of 40 henrys and a resistance of 290 ohms operating at 600 volts, is shown.

As will be seen from a curve A, the surge voltage reaches a magnitude around 2400 volts when condenser 15 has a capacity of 20 microfarads. When the capacity of condenser 15 is increased to as high as 140 microfarads, the surge voltage is still around 800 volts and is still in excess of the normal line voltage. It is evident, therefore, to keep the surge voltage down to 800 volts, a condenser having a capacity of 140 microfarads would be necessary. This would constitute an expensive item.

In curve B, the surge voltage capacity characteristic is obtained when a large resistor, such as resistor 16, is connected in parallel with the condenser 15, as shown. I have shown by curve B the reduced maximum surge which will occur with a 5000 ohm resistor at 16. As will be clear from this chart, the reduction in surge voltage is not appreciable and it still requires a condenser of very large capacity to reduce the surge voltage to any reasonable degree. At the higher capacity value of the condenser, the effect of the resistance is entirely inappreciable.

In curve C, I have shown the surge voltage capacity characteristics when a 2000 ohm resistor replaces the 5000 ohm resistor at 16, but here again the reduction in surge by the capacity is not appreciable.

From the above, it will be evident that in order to reduce the surge voltage to a reasonable value, it is necessary to make the resistance of such a low magnitude that it will carry a current relatively large in comparison with the field current, which, as pointed out hereinbefore, makes this system inefficient.

In breaking the field circuit the value of the surge depends, to a certain extent, on the time consumed in breaking the circuit at the switch.

Thus, if the switch operates instantaneously, a charge of full line voltage is left on the condenser and must first be dissipated by the inflow of the field current, before the condenser will charge in the opposite direction. Under such conditions, therefore, the effect of the condenser is augmented and we may expect a surge of a lower magnitude. However, this reduction is again of only slight magnitude. Thus, the curve D in Figure 4 illustrates the condition with a perfect switch; that is, a condition where the circuit breaks a line voltage of 600 volts. In such a case, the condenser 15 is charged by the 600 volts from the line. It will be assumed, for the purpose of illustration, that the charge is such as to leave the condenser charge positive at its right hand terminal and negative at its left hand terminal at the instant when the line is opened. As will be explained hereinafter, the surge voltage is in the opposite direction from the normal line voltage and accordingly, the condenser, in reversing its charge so that its right hand side is charged negatively and its left hand side positively, will reduce the surge voltage. This reduction, however, has been found not to be of any very great magnitude. Thus, it will be noticed that, even under such conditions, according to curve D, it will require a capacity of 80 microfarads to reduce the surge voltage to a safe value, as for example, 800 volts.

Comparing curve D with curve A, which shows the worst condition obtained, where the circuit is broken at the instant of zero voltage on a condenser by a slow opening of the circuit breaker, it will be noted that to reduce the surge voltage to a value of 800 volts, a condenser of almost twice the capacity is required in the case of curve A of that necessary in the case of curve D. In practice, it has been found that the surge will reach a magnitude somewhere between the curves A and D, as has been demonstrated by oscillographic tests. The curve E illustrates the reduction of the surge with a resistor of 200 ohms in series with the condenser. It will again be seen that the reduction is only a small percentage and calculations show that such a reduction only amounts to between 5 and 20% for the permissible values of series resistance.

On the other hand, it is evident that if the series resistor is large, the surge voltage may actually rise as the maximum surge condition will then occur at the instant of the break of the switch and independently of the charge on the condenser. Thus, it will be seen from the above consideration, that the utilization of these means for suppressing surges has very definite limitations in practice.

Where, on the other hand, resistors only are used in parallel with the field winding, the value of resistance necessary to dissipate the induced voltage energy is such that the resistance is of the same order of magnitude as the resistance of the field winding, since the current flow through this resistance may be of the same order of magnitude as the field current. Accordingly, when the field current is closed on the power line, this resistor will carry a current which must be of the same order of magnitude as the field current and, accordingly, constitutes an appreciable waste of energy during operating periods, which makes this arrangement prohibitive from the efficiency point of view.

In order to use the resistor method for dissipating energy, and, at the same time, to avoid waste of energy during operating periods, special switching arrangements have heretofore been provided for cutting out the resistor and connecting the resistor into the field circuit immediately preceding the breaking of the field circuit. As will be obvious, however, such switching arrangements must, of necessity, be very complicated and, accordingly, tend to fail at the very time when they are most needed, which makes them unreliable.

It is an object of my invention to provide simple, cheap, and novel apparatus for and methods of reducing and absorbing the surge voltage in an electrical circuit.

Still a further object of my invention is to provide an electrical arrangement of resistors asymmetrical with respect to an electrical circuit for reducing and absorbing surge voltage.

Still a further object of my invention is to provide an electrical device which will dissipate the surge voltage, but which will not permit flow of the normal line currents.

There are other objects of my invention which, together with the foregoing will appear in the detailed description which is to follow.

In the drawings, Figure 1 is a circuit diagram of one embodiment of my invention.

Figure 4 illustrates a number of curves showing the surge voltage under the aforegoing conditions.

Figures 5 and 6 are characteristic curves showing the voltage surge under the foregoing conditions.

Figure 7 is a circuit diagram of arrangements heretofore used for overcoming the difficulties of surges.

Figure 1:
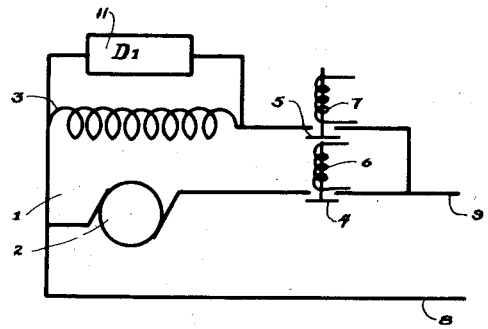

In Figure 1, direct current machine 1 comprises an armature winding 2 and a field winding 3. Field winding 3 has a relatively large number of turns and possesses a high inductance. The windings 2 and 3 are connected in multiple with each other through magnetically operated switches 4 and 5 controlled by the magnetic windings 6 and 7, respectively. The windings 6 and 7, which may be of the magnet type, are energized in any well-known manner by a remote operator over any well-known electrical circuit, to close their switch devices 4 and 5. The direct current machine 1 is energized from a source of power not shown, connected to the conductors 8 and 9.

Connected across the terminals of the field winding 3 is an electrical device 11, comprising an electrical resistance, such as shown and described in the Journal of the A. I. E. E., January, 1930—"Theory of New Valve Type Lightning", pages 34 to 37. This device, as is there explained, has a voltage current characteristic, such as shown in Figure 6. As illustrated in this figure, the voltage current curve is substantially a straight line up until the voltage reaches a certain point, as for example, at M. Thereafter any slight further increase in voltage causes a considerably larger increase in current due to the fact that the resistance from this point one is rapidly reduced.

The normal voltage across the field winding 3, Figure 1, is such that there is relatively little current flow through the device 11. Thus, for example, the voltage may be the value of L equal to the value of M, as shown in Figure 5. When, however, the switches 4 and 5 are opened and the field winding 3 is disconnected from the power source, the surge voltage induced in the field winding 3 rises above the value M, as shown by P, and the resistance of the device 11 rapidly decreases, permitting a large current flow and, accordingly, a dissipation of the energy and the reduction of the induced voltage, as shown by Q.

Figure 2:
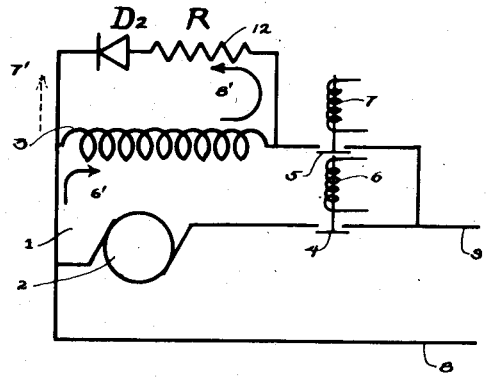
Figures 2 and 3 are circuit diagrams of modified forms of my invention.

In Figure 2, the same armature winding 2 and field winding 3 are used and the circuits therefor are controlled by similar switches 4 and 5 electromagnetically controlled by the magnets 6 and 7. Connected across the field winding 3 is a resistance unit 12 and, in series therewith, a rectifier device D2. This rectifier device may, for instance, be a dry type rectifier, an electronic rectifier, a gaseous discharge rectifier, or an electrochemical rectifier.

To explain the operation, it will be assumed that current flows through field windings 3 in the direction shown by the arrow 6'. The direction of current is such that the rectifier prevents any current flow therethrough, as the pressure is in in-operative direction of the rectifier, as shown by arrow 7'. When now the main circuit is opened, the current seeks a path through the rectifier in the direction shown by the arrow 8'. The direction of current through the rectifier is now such that it is passed and accordingly, the field current is permitted to die down slowly through the resistance 12, preventing the generation of any excessive surge voltage.

In Figure 2, the resistance 12, since it is normally non-operative by reason of the fact that it is connected in circuit with a one-way detector rectifier D2, may be made sufficiently low so that when the current does flow through it, it will act to effectively absorb the entire discharge. In fact, if preferred, it may be omitted entirely if the rectifier is capable of carrying the full field current and if the speed of destruction of the magnetic field is not important. The energy is then dissipated in the resistance of the field winding itself, rather than in the series resistance R.

In this circuit the maximum surge voltage occurs at the instant of the break and may be expressed by the formula:

$$V_{max} = V_o \times \frac{R_1}{R}$$

wherein $R_1$ is the resistance across the field circuit and R is the resistance of the field winding. It is evident that by having the resistance $R_1$ sufficiently small, the surge voltage can be reduced to any desirable low value. The only limitation resides in the duration of the surge current, which may become long if the dissipating resistance is too low. This duration is expressed by the formula $$T = 2.3 \times \frac{L}{R + R_1}$$

in which L is the inductance and T is the time for reducing the surge potential to one tenth of the line potential. In practice, it will be found to be generally less than one second, even when the resistance $R_1$ is entirely omitted.

Figure 3:
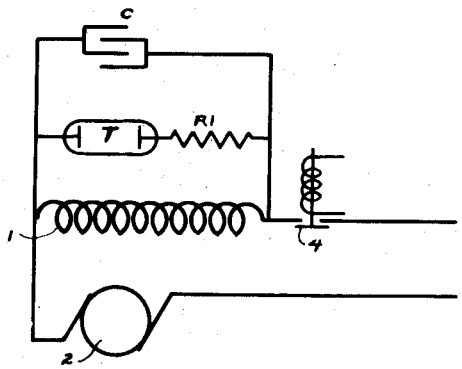

In Figure 3, there is shown an ordinary glow discharge tube T connected across the field winding in series with the resistance $R_1$ and the condenser C in parallel with the field. The glow discharge tube may be of the type which possesses the variable resistance characteristic illustrated in Figure 6, or a glow discharge tube having more definite rectifying characteristics, such as, for instance, a mercury arc, may be used. In the latter case, the anode and cathode must be arranged with a view to preventing the flow of normal current when the motor is connected to the main power line and for permitting the discharge current to flow through the glow tube.

Resistance $R_1$ may be connected in series with a glow discharge tube and an additional condenser C may be connected in parallel with the field winding, to take care of any excessive surge voltage that may occur during the initial breaking of the circuit before the tube is energized and which the tube may be incapable of handling by itself, due to its low capacity.

As is well known, a glow discharge tube responds practically instantaneously to the voltage applied. However, since the current passing through the field circuit must immediately be taken up either by the glow discharge tube or some equivalent device and the necessary ionization may require a certain small interval of time, I insert the condenser C, which in this case need be only of a very small capacity as its object is only to retard the surge current by a time less than 1/1000 of a second. Thus, a condenser of a capacity less than 1 microfarad will ordinarily be quite sufficient.

This figure shows a series motor connection but, of course, the same combination may be utilized for shunt motor fields. Moreover, identical connections may be utilized for direct current generator fields, alternating current generator fields, or any circuit possessing a large inductance in which the current is suddenly interrupted. Such circuits are quite commonly met with in the engineering art, and it will be understood that my invention is not limited to the specific illustration thereof given in the above, but has a more general application to all such instances where large inductances are used, as, for example, direct current relay coils, large sized electromagnets, circuit interrupters, etc.

What I claim is:—

1. In combination, a direct current circuit including an inductance of high value, a source of energy therefor, and a rectifier connected across said inductance, to oppose the flow of current normally but to pass the induced current from the inductance on interruption of said source of energy.

2. In combination, an electrical system including an inductance, a source of energy, means for interrupting said energy, and circuit means shunting said inductance comprising a dissipating impedance and a device having a high resistance to the voltage of said source of energy and substantially low resistance to surge voltage induced in said inductance, on interruption of said energy.

3. An electrical circuit including a high inductance; means for protecting said circuit against switching surges; said means comprising a rectifier and a high resistance connected to said inductance for blocking normal flow of current in said resistance and bypassing and dissipating currents induced in said inductance when said electrical circuit is suddenly opened.

4. An electrical circuit including a high inductance; means for protecting said circuit against switching surges; said means comprising a rectifying element; circuit connections for said rectifying element to said electrical circuit for normally preventing the current flowing in said electrical circuit from passing through said rectifying element and providing a bypass circuit for currents induced in said inductance through said rectifying element and a resistance means connected to said rectifier for dissipating the energy of induced currents.

5. A direct current electrical circuit including a high inductance; means for protecting said circuit from switching surges, said means consisting of an absorbing circuit across said inductance comprising an asymmetrical resistance device connected to normally block the flow of current and to by-pass currents induced in said inductance when said electrical circuit is suddenly opened.

6. A direct current electrical circuit including a high inductance; means for protecting said circuit from switching surges, said means comprising an absorbing circuit across said inductance including an asymmetrical resistance device connected to normally block the flow of current through said absorbing circuit and to by-pass currents induced in said inductance upon opening of said electrical circuit to be dissipated in said absorbing circuit; and a condenser connected across said inductance.

7. A direct current electrical circuit including a high inductance; means for protecting said circuit against switching surges; said means comprising a dissipating resistance in series with an asymmetrical resistance device connected across said inductance to normally prevent the flow of current and to bypass currents induced in said inductance when said electrical circuit is suddenly opened.

ALEXANDER NYMAN.